(12) United States Patent
Rungger

(10) Patent No.: US 10,227,733 B2
(45) Date of Patent: Mar. 12, 2019

(54) RAIL VEHICLE HAVING A DEVICE FOR FINISHING THE RUNNING SURFACE OF TRACK RAILS

(71) Applicant: Maschinenfabrik Liezen und Giesserei Ges.m.b.H., Liezen (AT)

(72) Inventor: Helmut Rungger, Roitham (AT)

(73) Assignee: MASCHINENFABRIK LIEZEN UND GIESSEREI GES.M.B.H., Liezen (AT)

( * ) Notice: Subject to any disclaimer, the term of this patent is extended or adjusted under 35 U.S.C. 154(b) by 50 days.

(21) Appl. No.: 15/500,236

(22) PCT Filed: Jul. 28, 2015

(86) PCT No.: PCT/AT2015/050184
§ 371 (c)(1),
(2) Date: Jul. 17, 2017

(87) PCT Pub. No.: WO2016/015078
PCT Pub. Date: Feb. 4, 2016

(65) Prior Publication Data
US 2017/0314210 A1    Nov. 2, 2017

(30) Foreign Application Priority Data
Jul. 29, 2014   (AT) .............................. A 50532/2014

(51) Int. Cl.
*E01B 31/13*    (2006.01)
*B23C 3/00*    (2006.01)
*B23C 1/00*    (2006.01)

(52) U.S. Cl.
CPC .............. *E01B 31/13* (2013.01); *B23C 3/005* (2013.01); *B23C 1/007* (2013.01);
(Continued)

(58) Field of Classification Search
CPC ......... E01B 31/12; E01B 31/13; B23C 1/007; B23C 1/20; B23C 3/005; B23C 3/002;
(Continued)

(56) References Cited

U.S. PATENT DOCUMENTS 1,138,656 A *  5/1915  Hilliard ................ B23Q 9/0014
                                                  409/178
1,759,325 A *  5/1930  Schmidt ................. E01B 31/12
                                                   15/93.1
(Continued)

FOREIGN PATENT DOCUMENTS

CH              672 338 A5      11/1989
EP              0 668 398 A1     8/1995
(Continued)

*Primary Examiner* — Daniel Howell
*Assistant Examiner* — Yasir Diab
(74) *Attorney, Agent, or Firm* — Muirhead and Saturnelli, LLC

(57) ABSTRACT

A rail vehicle includes a milling device for finishing the running surface of track rails during the travel of the rail vehicle along the track rails. The rail vehicle has a chassis frame having wheel sets. The milling device is provided with a milling head, and includes a framework arranged on the chassis frame having a milling head receptacle, which is displaceable vertically and transversely in relation thereto. The milling head receptacle can be supported for the vertical guiding via a guide shoe on the running surface and for transverse guiding in parallel to the milling head shaft via a guide stop laterally on the railhead. The milling head receptacle forms a transverse carriage, which supports the guide shoe and the guide stop, and the guide path of which, which is vertically displaceable, is provided on the side of the milling head receptacle facing toward the guide shoe.

14 Claims, 5 Drawing Sheets

(52) U.S. Cl.
CPC ...... *B23C 2215/32* (2013.01); *B23C 2220/28* (2013.01); *Y10T 408/5565* (2015.01); *Y10T 409/30672* (2015.01); *Y10T 409/306384* (2015.01)

(58) Field of Classification Search
CPC ....... B23C 2215/32; Y10T 409/304144; Y10T 409/3042; Y10T 409/304256; Y10T 409/306384; Y10T 409/306496; Y10T 409/30672; Y10T 409/305208; Y10T 408/556; Y10T 408/5565
See application file for complete search history.

(56) References Cited

U.S. PATENT DOCUMENTS

| | | | | |
|---|---|---|---|---|
| 1,887,424 | A * | 11/1932 | Perazzoli | E01B 31/13 104/307 |
| 1,906,872 | A * | 5/1933 | Perazzoll | E01B 31/17 451/347 |
| 3,738,066 | A * | 6/1973 | Panetti | E01B 31/17 451/347 |
| 3,823,455 | A * | 7/1974 | McIlrath | E01B 31/17 29/33 R |
| 3,882,645 | A * | 5/1975 | Duecker | E01B 31/17 451/347 |
| 4,294,046 | A * | 10/1981 | Damiano | E01B 31/00 104/307 |
| 4,309,847 | A * | 1/1982 | Panetti | E01B 31/17 451/347 |
| 4,396,323 | A * | 8/1983 | Theurer | E01B 31/15 409/296 |
| 4,615,150 | A * | 10/1986 | Panetti | B24B 19/004 451/347 |
| 4,993,193 | A * | 2/1991 | Panetti | E01B 31/17 451/347 |
| 5,067,283 | A * | 11/1991 | Pomikacsek | E01B 31/17 104/279 |
| 5,566,437 | A | 10/1996 | Jaeggi | |
| 5,580,299 | A * | 12/1996 | Pomikacsek | E01B 31/17 125/11.03 |
| 6,981,907 | B1 * | 1/2006 | Korinek | B24B 19/004 451/139 |
| 2012/0288342 | A1 * | 11/2012 | Rungger | B23C 3/005 409/231 |
| 2013/0189045 | A1 * | 7/2013 | Behrens | E01B 31/13 409/132 |

FOREIGN PATENT DOCUMENTS

| | | |
|---|---|---|
| EP | 0 952 225 A2 | 10/1999 |
| GB | 2 121 710 A | 1/1984 |
| WO | WO 2013/086547 A1 | 6/2013 |

* cited by examiner

RAIL VEHICLE HAVING A DEVICE FOR FINISHING THE RUNNING SURFACE OF TRACK RAILS

1. Field of the Invention

The system described herein relates to a rail vehicle and more particularly to rail vehicle for finishing a surface of track rails.

2. Description of the Prior Art

In rail vehicles for finishing the running surface of track rails, providing a chassis frame with a passage opening for the milling device is known (EP 0 952 225 A1). Such systems avoid having to provide an upwardly protruding chassis frame for housing the milling device below the chassis frame. The milling head shaft extends above the chassis frame and is mounted in a vertical carriage, which is guided in a transverse carriage, so that the milling head can be guided correctly for the machining via upstream and downstream support rollers, which are provided with wheel flanges, as the milling head travels along the running surfaces of the track rails as a slotted guide. Because of the passage opening in the chassis frame of the rail vehicle and the arrangement of the milling head shaft above the chassis frame, no difficulties result with respect to the structural height of the milling device and the arrangement of the compound carriage, which is composed of the vertical and the transverse carriages, inside the rail vehicle. However, such a system is disadvantageous in that the rail vehicle requires a special design of the chassis frame, and a comparatively large diameter of the milling head, which necessarily results from the proposed design, requires correspondingly large axle distances between the wheel sets of the rail vehicle upstream and downstream of the milling device, which makes it substantially more difficult to machine track rails having small curve radii, as occur in subways, for example.

Similar disadvantages result in the case of another known milling device (disclosed, for example, in WO 2013/086547 A1), in which the milling head is adjustable with the aid of a compound carriage, which is upstream in the travel direction and which is composed of a transverse carriage and a vertical carriage. The vertical carriage is guided on the transverse carriage and forms a milling head receptacle and carries a guide shoe in the groin region between the track rail and the milling head. The milling head, which penetrates the chassis frame of the rail vehicle, is provided via a separate positioning drive, which is activated via a measuring unit formed by the sliding shoe as a measuring sensor, for example, to avoid the disadvantages which result from the design-related spacing of the milling head from the guide path of the transverse carriage of the compound carriage.

Accordingly, it is desirable to provide a rail vehicle having a device for finishing the running surface of the track rails so that special designs for the chassis frame are avoided and advantageous conditions are provided for the machining of track rails having comparatively small curve radii.

SUMMARY OF THE INVENTION

Proceeding from a rail vehicle of the type mentioned at the outset, the system described herein provides a milling head receptacle that forms a transverse carriage, which carries the guide shoe and the guide stop, and the vertically displaceable guide path of which is provided on a side of the milling head receptacle facing toward the guide shoe, and the diameter of the milling head corresponds to at most half of the wheel diameter of the wheel sets.

Because a lateral guide path is associated with the transverse carriage forming the milling head receptacle, the structural height of the milling device is not enlarged by the guide of the transverse carriage, which advantageously provides for the arrangement of the milling device below the chassis frame, without having to offset the chassis frame upward or provide the chassis frame with a passage opening for the milling device. With a diameter of the milling head less than half of the wheel diameter of the wheel sets of the rail vehicle, it is therefore possible to provide the milling device on the lower side of the chassis frame while maintaining a sufficient positioning distance vertically, without having to alter the chassis frame. Disadvantages of milling heads having smaller diameter with respect to the waviness of the machined running surface can be more than compensated for by a reduction of the spacing of the milling cutters in the circumferential direction and increasing the number of the milling head revolutions. Notwithstanding the fact that rail vehicles having conventional chassis frames can be employed for the use of milling devices according to the system described herein, the weight of the milling heads may be disproportionately reduced as the diameters of the milling heads become smaller, so that a simple change of the entire milling head is possible by pulling the milling head off axially from the milling head shaft by hand. The smaller milling head diameter additionally enables a reduction of the spacing of the guide shoe, which is upstream from the milling head in the travel direction and is supported on the running surface of the track rail, from the engagement region of the milling head, whereby the guiding accuracy of the milling head is increased. In addition, the guide shoe is provided on the side of the guide path for the transverse carriage, which enables a compact construction having a comparatively small extension in the travel direction.

The design according to the system described herein of the milling head receptacle as a transverse carriage additionally represents an advantageous condition for an arrangement of the guide shoe below the guide path for the transverse carriage, so that a separate positioning drive is not required for the vertical guiding of the milling head and only the transverse carriage has to be held pressed against the running surface of the track rail via the guide shoe. To set the cutting depth or the chip thickness, only the vertical spacing between the milling head and the guide shoe has to be set, for example, by a corresponding displacement of the guide shoe. In addition, an advantageous force introduction from the transverse carriage into a guide path of the transverse carriage results with the arrangement of the guide shoe below the guide path for the transverse carriage, which is advantageous for light construction.

To be able to ensure the shortest possible structural height for the milling device, the motor provided for the milling head drive can be provided on the side of the milling head receptacle opposite to the guide path for the transverse carriage.

The vertical guide for the milling head receptacle could be provided on the end face of the milling head receptacle opposite to the milling head. However, simpler design conditions result if the vertical guide for the milling head receptacle is provided on the side of the guide path for the transverse carriage, i.e., the vertical guide is upstream from the transverse carriage forming the milling head receptacle in the travel direction.

The vertical guide for the milling head receptacle can have different designs. One simple possibility is to provide a feed carriage which is mounted so the feed carriage is vertically displaceable in the framework for the vertical guide of the transverse carriage. Instead of such a feed carriage, the transverse carriage can also be linked to the framework via an articulated parallelogram for the vertical guide. The movement component in the rail longitudinal direction which is linked to the vertical adjustment of the transverse carriage via an articulated parallelogram is small and does not play a role in the machining of the running surface of the track rails.

Because the transverse carriage forming the milling head receptacle remains free on the upper and lower sides as a result of a lateral guide path of the transverse carriage, the guide stop for the transverse guide of the milling head receptacle can advantageously be applied to the railhead below the milling head, which provides particularly advantageous design conditions with respect to the transverse guide of the milling head.

BRIEF DESCRIPTION OF THE DRAWING

The subject matter of the invention is illustrated by way of example in the drawings. In the figures.

DESCRIPTION OF THE PREFERRED EMBODIMENT

Figure 1:
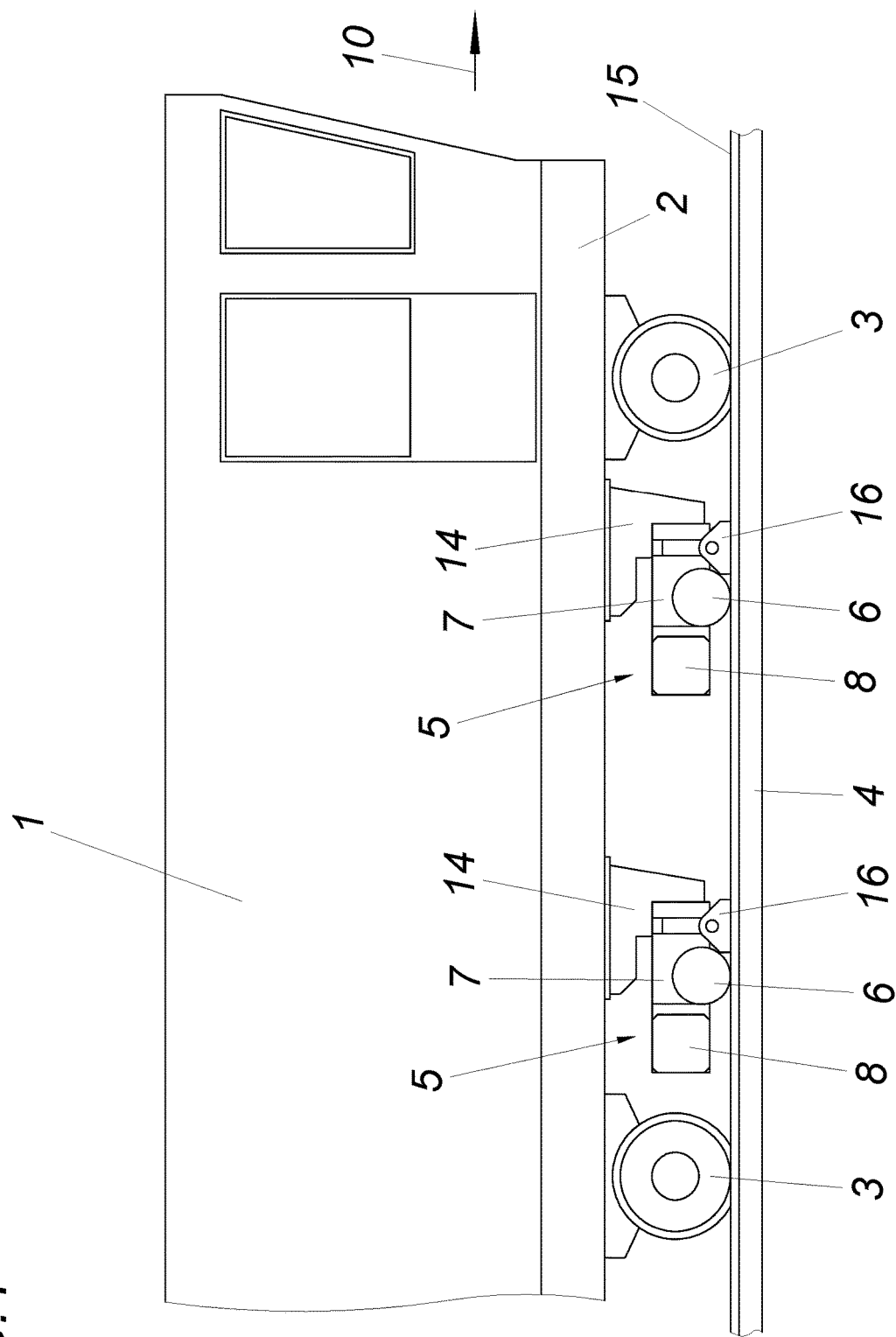
FIG. 1 shows a portion of a rail vehicle having a milling device for finishing the running surface of rail tracks in a schematic side view, according to the system described herein.

The rail vehicle 1 has, according to FIG. 1, a chassis frame 2 having wheel sets 3, which roll on track rails 4. Two corresponding milling devices 5 for the track rails 4 are arranged between each of the wheel sets 3 below the linear continuous chassis frame 2. The milling devices 5 have a milling head 6, which is mounted in a milling head receptacle 7 and is driven in a way known per se via a motor 8. The milling head receptacle 7 forms, according to FIGS. 2 and 3, a transverse carriage 9, which is guided in parallel to the milling head shaft in a guide path 11, which is upstream from the milling head receptacle 7 with respect to the travel direction 10. The guide path 11 for the transverse carriage 9, which is opposite to the motor 8 for the milling head drive with respect to the milling head receptacle, is displaceable vertically via a feed carriage 12, which is held so the feed carriage 12 is displaceable in a guide 13 of a framework 14. The positioning drives for the transverse carriage 9 and the feed carriage 12 are not shown for reasons of comprehensibility and can consist of hydraulic positioning cylinders or spindle drives, for example.

A guide shoe 16, which is supported on the not yet machined running surface 15 is mounted so the guide shoe 16 is adjustable in height in relation to the milling head receptacle 7, to be able to set the cutting depth of the milling head 6. The guide shoe 6 is used to guide the milling head 6 in relation to the running surface 15 to be machined of the respective track rail 4. As can be inferred from FIG. 2 in particular, the pivotably mounted guide shoe 16 is mounted directly upstream from the milling head 6 in the travel direction 10, so that an advantageous slotted guide by the running surface 15 itself results for the running surface machining by the milling head 6.

In addition to the vertical guiding of the milling head receptacle 7 via the guide shoe 16, the milling head receptacle 7 is additionally provided with a guide stop 17 for the transverse guide. The guide stop 17 presses against the inside of the railhead 18 below the milling head 6, so that via the application of the transverse carriage 9 for the contact of the guide stop 17 on the railhead 18, the milling head 6 can be moved accurately along the track rail 4. Two positioning drives 19 inside the milling head receptacle 7, which engage on a carrier 20 for the guide stop 17, are used for aligning the guide stop 17.

The design conditions taken for the milling device 5 enable the use of milling heads 6, the diameter of which is less than half of the wheel diameter of the wheel sets 3. With such milling head diameters, in conjunction with the remaining design conditions, simple machining conditions result for the running surfaces 15 of the track rails 4, because, on the one hand, the milling devices 5 can be provided without refitting requirements directly on the lower side of the chassis frame 2 of a rail vehicle 1 and, on the other hand, the compact construction provides advantageous conditions in particular for track rails 4 having small curve radii. The handling of the milling devices 5 is simple and enables in particular a rapid change of the milling head 6. The milling head 6 merely has to be pulled off of the milling head shaft, which can be performed by hand as a result of the comparatively low weight of the milling head 6.

Figure 2:
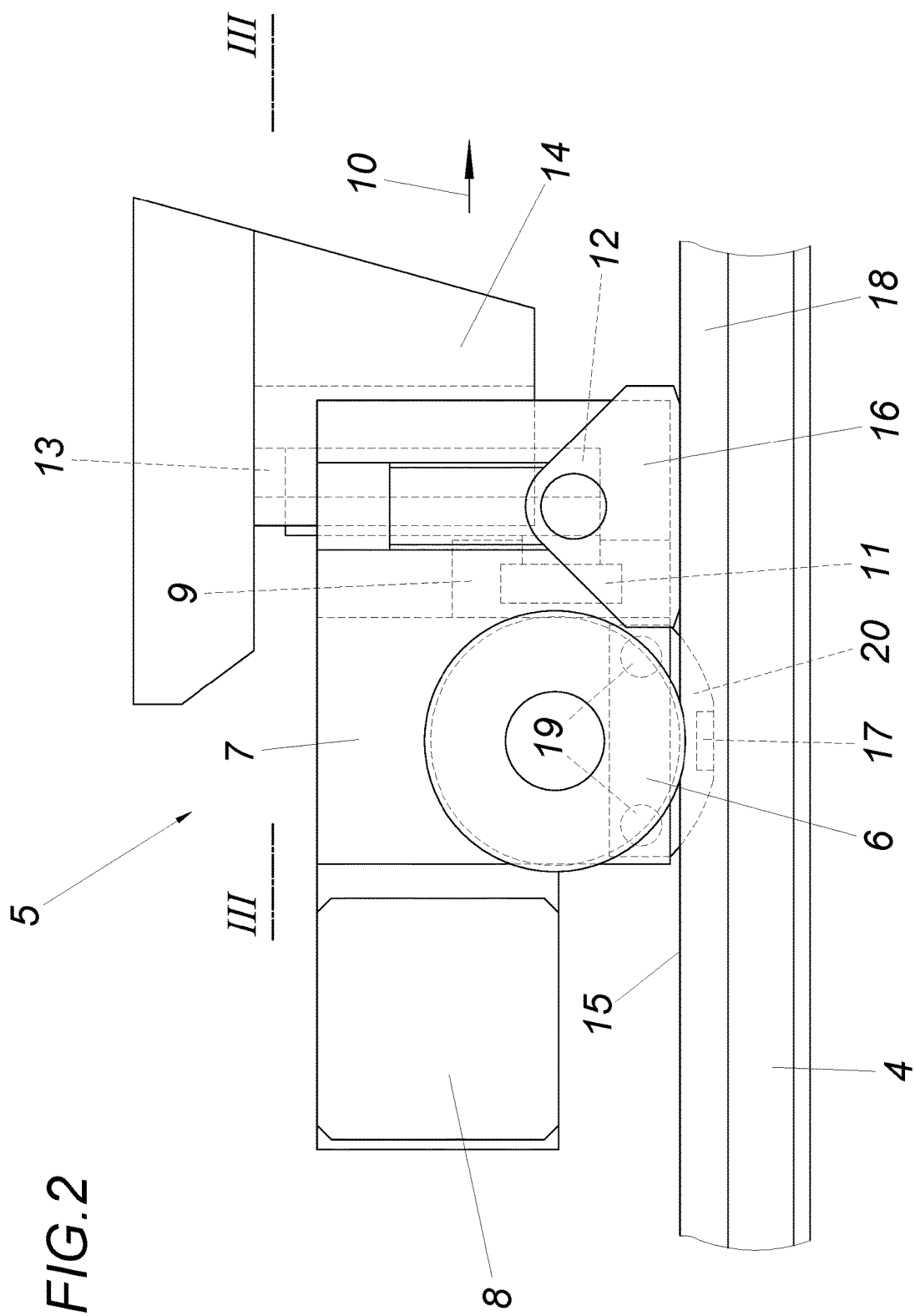
FIG. 2 shows a side view of the milling device in a larger scale, according to the system described herein.
Figure 3:
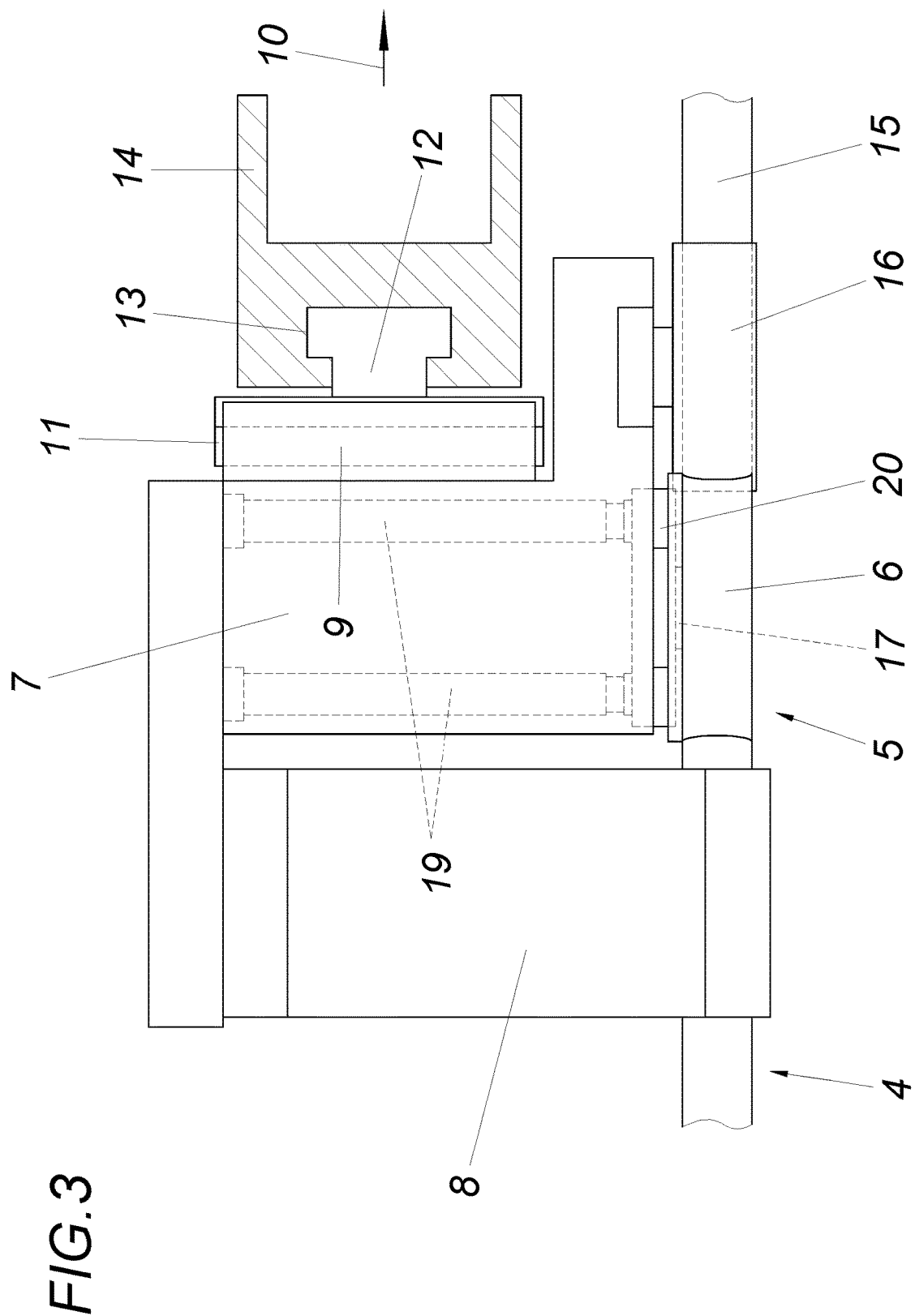
FIG. 3 shows a section along line III-III of FIG. 2, according to the system described herein.
Figure 4:
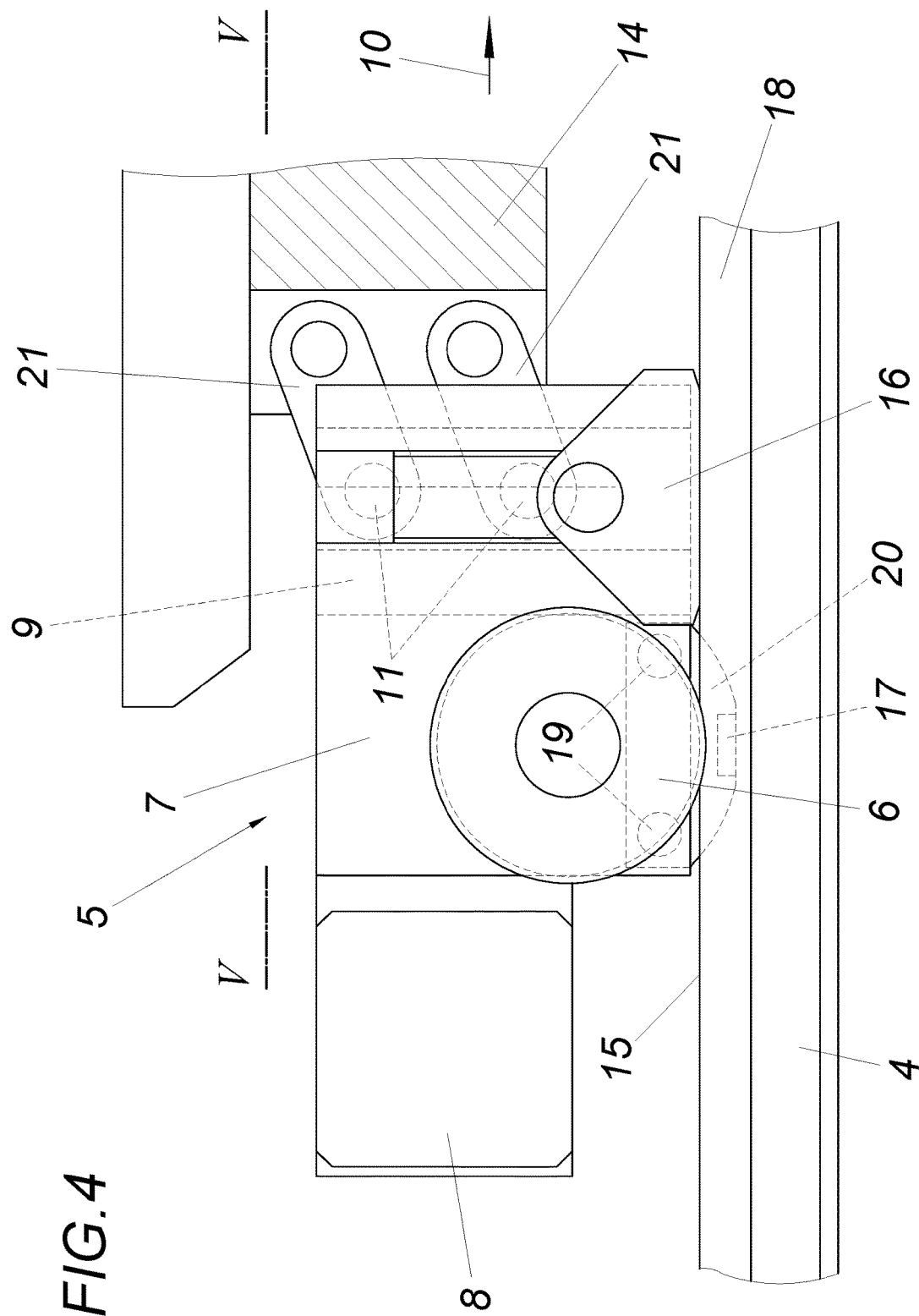
FIG. 4 shows an illustration corresponding to FIG. 2 of an embodiment variant of a milling device according to the system described herein.
Figure 5:
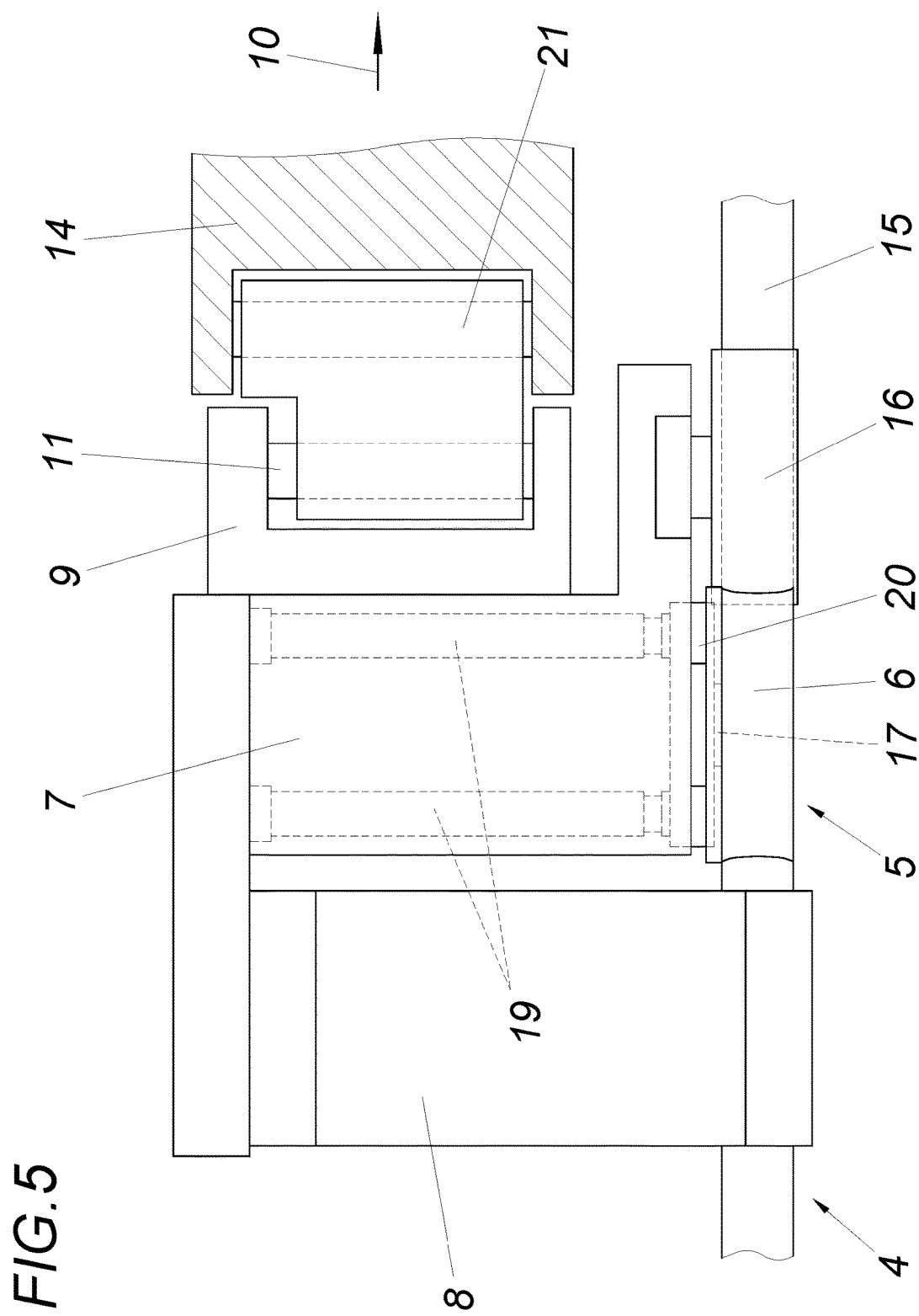
FIG. 5 shows a section along line V-V of FIG. 4 according to the system described herein.

The embodiment according to FIGS. 4 and 5 differs from the design according to FIGS. 2 and 3 in that the vertical guiding for the milling head receptacle 7 is not produced via a feed carriage 12, but rather via an articulated parallelogram 21. The guide path 11 for the transverse carriage 9 of the milling head receptacle 7 is achieved in this case in a simple manner by the linkage axes of the articulated parallelogram 21 on the transverse carriage 9, as can be inferred from FIG. 5.

The invention claimed is:
1. A rail vehicle, comprising:
   a chassis frame;
   a set of wheels coupled to the chassis frame; and
   a milling device coupled to the chassis frame for finishing a running surface of track rails during travel of the rail vehicle along the track rails, wherein the milling device includes a milling head and a framework arranged on the chassis frame with a milling head receptacle that is displaceable vertically and transversely in relation thereto, the milling head receptacle being supported for vertical guiding via a guide shoe on the running surface and being supported for transverse guiding in parallel to a milling head shaft via a guide stop laterally on a railhead, wherein the milling head receptacle forms a transverse carriage which supports the guide shoe and the guide stop, the transverse carriage having a guide path that is parallel to the milling head shaft and that is vertically displaceable and provided on a side of the milling head receptacle facing toward the guide shoe and wherein a diameter of the milling head is less than or equal to half of a wheel diameter of the wheel sets.

2. The rail vehicle according to claim 1, wherein the guide shoe is arranged below the guide path of the transverse carriage.

3. The rail vehicle according to claim 1, further comprising:
a motor for the milling head drive arranged on the side of the milling head receptacle opposite to the guide path.

4. The rail vehicle according to claim 1, further comprising:
a vertical guide for the milling head receptacle provided on a side of the guide path for the transverse carriage.

5. The rail vehicle according to claim 1, further comprising:
a feed carriage mounted to be vertically displaceable in the framework to vertically guide the transverse carriage.

6. The rail vehicle according to claim 1, wherein the transverse carriage is vertically guided via an articulated parallelogram on the framework.

7. The rail vehicle according to claim 1, wherein the guide stop is applied below the milling head to the railhead.

8. A milling device for a rail vehicle for finishing a running surface of track rails during travel of the rail vehicle along the track rails, comprising:
a milling head;
a milling head receptacle that is displaceable vertically and transversely in relation to the milling head, the milling head receptacle being supported for vertical guiding via a guide shoe on the running surface and being supported for transverse guiding in parallel to a milling head shaft via a guide stop laterally on a railhead, wherein the milling head receptacle forms a transverse carriage which supports the guide shoe and the guide stop, the transverse carriage having a guide path that is parallel to the milling head shaft and that is vertically displaceable and provided on a side of the milling head receptacle facing toward the guide shoe and wherein a diameter of the milling head is less than or equal to half of a wheel diameter of the wheel sets.

9. The milling device according to claim 8, wherein the guide shoe is arranged below the guide path of the transverse carriage.

10. The milling device according to claim 8, further comprising:
a motor for the milling head drive arranged on the side of the milling head receptacle opposite to the guide path.

11. The milling device according to claim 8, further comprising:
a vertical guide for the milling head receptacle provided on a side of the guide path for the transverse carriage.

12. The milling device according to claim 8, further comprising:
a framework arranged on a chassis frame of the rail vehicle; and
a feed carriage mounted to be vertically displaceable in the framework to vertically guide the transverse carriage.

13. The milling device according to claim 8, further comprising:
a framework arranged on a chassis frame of the rail vehicle,
wherein the transverse carriage is vertically guided via an articulated parallelogram on the framework.

14. The milling device according to claim 8, wherein the guide stop is applied below the milling head to the railhead.

* * * * *